(12) United States Patent
Mourn

(10) Patent No.: US 9,575,866 B1
(45) Date of Patent: Feb. 21, 2017

(54) DIAGNOSTIC MODULE FOR MONITORING ELECTRONIC DATA TRANSMISSION

(71) Applicant: Richard Mourn, Colorado Springs, CO (US)

(72) Inventor: Richard Mourn, Colorado Springs, CO (US)

(73) Assignee: DAP Holding B.V., Oldenzaal (NL)

( * ) Notice: Subject to any disclaimer, the term of this patent is extended or adjusted under 35 U.S.C. 154(b) by 173 days.

(21) Appl. No.: 14/535,161

(22) Filed: Nov. 6, 2014

(51) Int. Cl.
G06F 11/00 (2006.01)
G06F 11/34 (2006.01)
G06F 11/30 (2006.01)

(52) U.S. Cl.
CPC ......... G06F 11/349 (2013.01); G06F 11/3024 (2013.01); G06F 11/3027 (2013.01)

(58) Field of Classification Search
USPC .......................................................... 714/30
See application file for complete search history.

(56) References Cited

U.S. PATENT DOCUMENTS

| | | | |
|---|---|---|---|
| 7,269,679 B1* | 9/2007 | Cho | G06F 13/385 710/104 |
| 7,984,351 B2* | 7/2011 | Owen | G01R 31/31726 713/500 |
| 2006/0191997 A1* | 8/2006 | Toohey | G06Q 20/1085 235/379 |
| 2007/0220357 A1* | 9/2007 | Vedanabhatla | H04K 3/46 714/43 |
| 2012/0222103 A1* | 8/2012 | Bliding | G07C 9/00103 726/7 |
| 2014/0025995 A1* | 1/2014 | Narayanan | G06F 11/0706 714/37 |
| 2015/0309911 A1* | 10/2015 | Lefor | G06F 11/3495 714/37 |

* cited by examiner

Primary Examiner — Sarai Butler
(74) Attorney, Agent, or Firm — Edwin H. Crabtree; Ramon L. Pizarro

(57) ABSTRACT

A Sub-Diagnostic Module incorporated into a System Module. The Sub-Diagnostic Module receives signals from the System Modules through the diagnostic signal interface. The diagnostic signal interface passes the signals through to the diagnostic signal evaluation logic where it determines if a signal or combination of signals is an event to be recorded in the sub-diagnostic registers and/or the sub-diagnostic log memory. The events recorded in the registers and log memory are accessed by the Portable Diagnostic Module through the Sub-Diagnostic Module's diagnostic protocol interface. Recorded events placed in log memory are synchronized by the sub-diagnostic time synchronizer. The time synchronizer receives high resolution time information from a local clock, such as a physical layer clock, and lower resolution network synchronized information from the diagnostic protocol interface.

9 Claims, 5 Drawing Sheets

Sub-Diagnostic Module Block Diagram

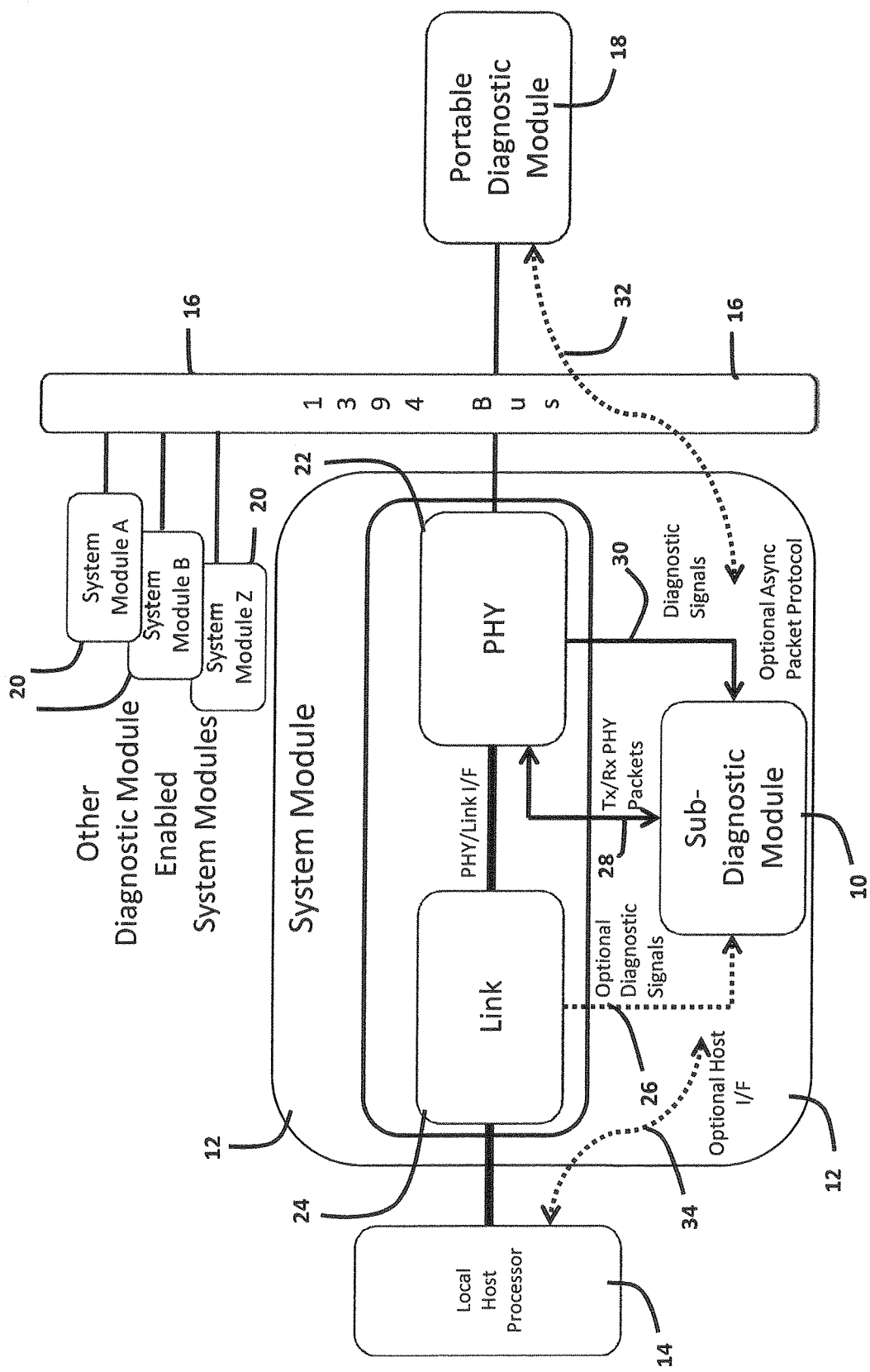
Figure 1 – System Module Architecture

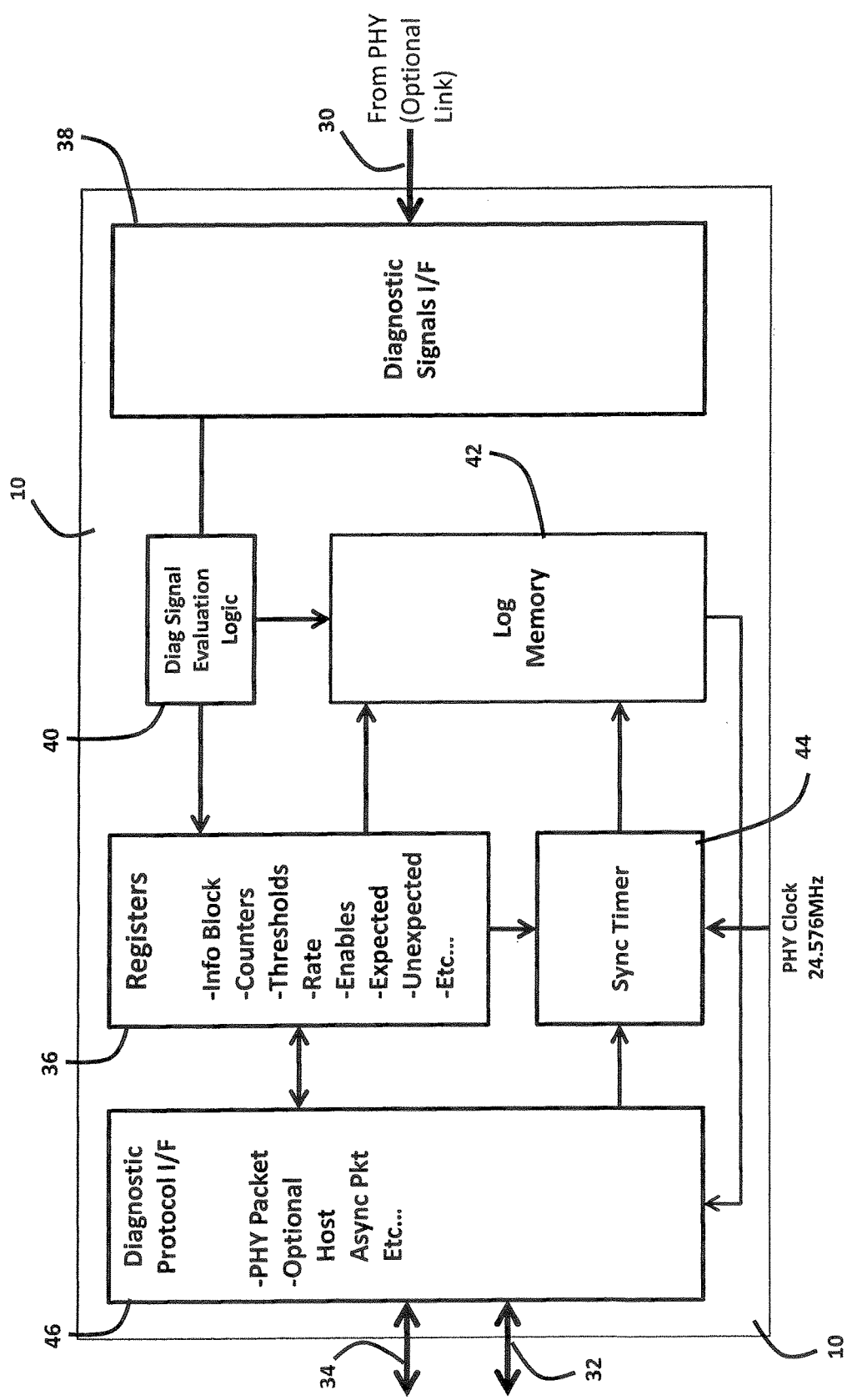
Figure 2 – Sub-Diagnostic Module Block Diagram

| | 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|
| 0 | | | | | | | | | | | Static ID | | | | | | |
| 2 | Log_Size_Lo | | | | | | | | | | | | | | | | Size in Quadlets |
| 4 | Log_Size_Hi | | | | | | | | | | | | | | | | |
| 6 | Reserved | | | | | | | | Max_Concatenated | | | | | | | | Max_Concatenated |
| 8 | Reserved | | | | | | | | | | | | | | | | |
| A | Reserved | | | | | | | | | | | | | | | | |
| C | Log_Mem_Lo | | | | | | | | | | | | | | | | Log Memory Lo Word |
| E | Log_Mem_Hi | | | | | | | | | | | | | | | | Log Memory Hi Word |
| 10 | Reserved | | | | | | | Number of Registers | | | | | | | | | Indicates the number of register in the next section |
| 12 | Counter1 | | | | | | | | | | | | | | | | Bus Reset |
| 14 | Counter Threshold1 | | | | | | | | | | | | | | | | Bus Reset Threshold |
| 16 | Counter2 | | | | | | | | | | | | | | | | portError |
| 18 | Counter Threshold2 | | | | | | | | | | | | | | | | portError Threshold |
| 1A | Counter3 | | | | | | | | | | | | | | | | Invalid 8b10b symbol |
| 1C | Counter Threshold3 | | | | | | | | | | | | | | | | Invalid 8b10b symbol thresold |
| 20 | Counter4 | | | | | | | | | | | | | | | | Unexpect Ctl Char |
| 22 | Counter Threshold4 | | | | | | | | | | | | | | | | Unexpect Ctl Char Threshold |
| 24 | Counter5 | | | | | | | | | | | | | | | | Running Disparity Error |
| 26 | Counter Threshold5 | | | | | | | | | | | | | | | | Running Disp Error Threshold |
| 28 | Counter6 | | | | | | | | | | | | | | | | resetCount > 3 |
| 2A | Counter Threshold6 | | | | | | | | | | | | | | | | resetCount > 3 Threshold |
| | Counter7 | | | | | | | | | | | | | | | | invalidCount>3 |
| | Counter Threshold7 | | | | | | | | | | | | | | | | invalidCount>3 Threshold |
| ... | CounterN | | | | | | | | | | | | | | | | ... |
| ... | Counter ThresholdN | | | | | | | | | | | | | | | | ... |
| ... | Reserved | | | | | | | Number of Registers | | | | | | | | | Indicates the number of register in the next section |
| ... | ... | ... | ... | ... | ... | ... | ... | ... | Tn | T7 | T6 | T5 | T4 | T3 | T2 | T1 | Threshold Warning Enable |
| ... | ... | ... | ... | ... | ... | ... | ... | ... | Cn | C7 | C6 | C5 | C4 | C3 | C2 | C1 | Cause Code Warning Enable |

Figure 3 – Example Diagnostic Module Register Map

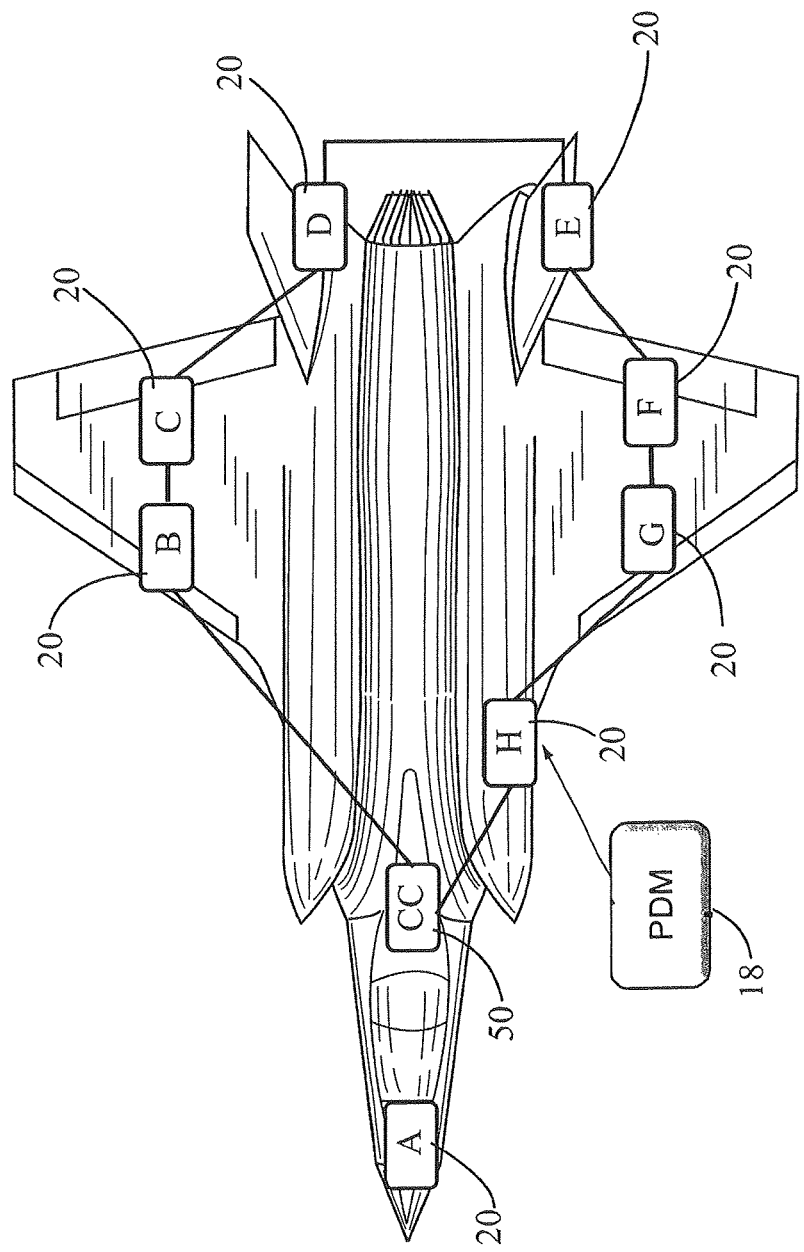
Figure 4 – Example Management Network Implementation

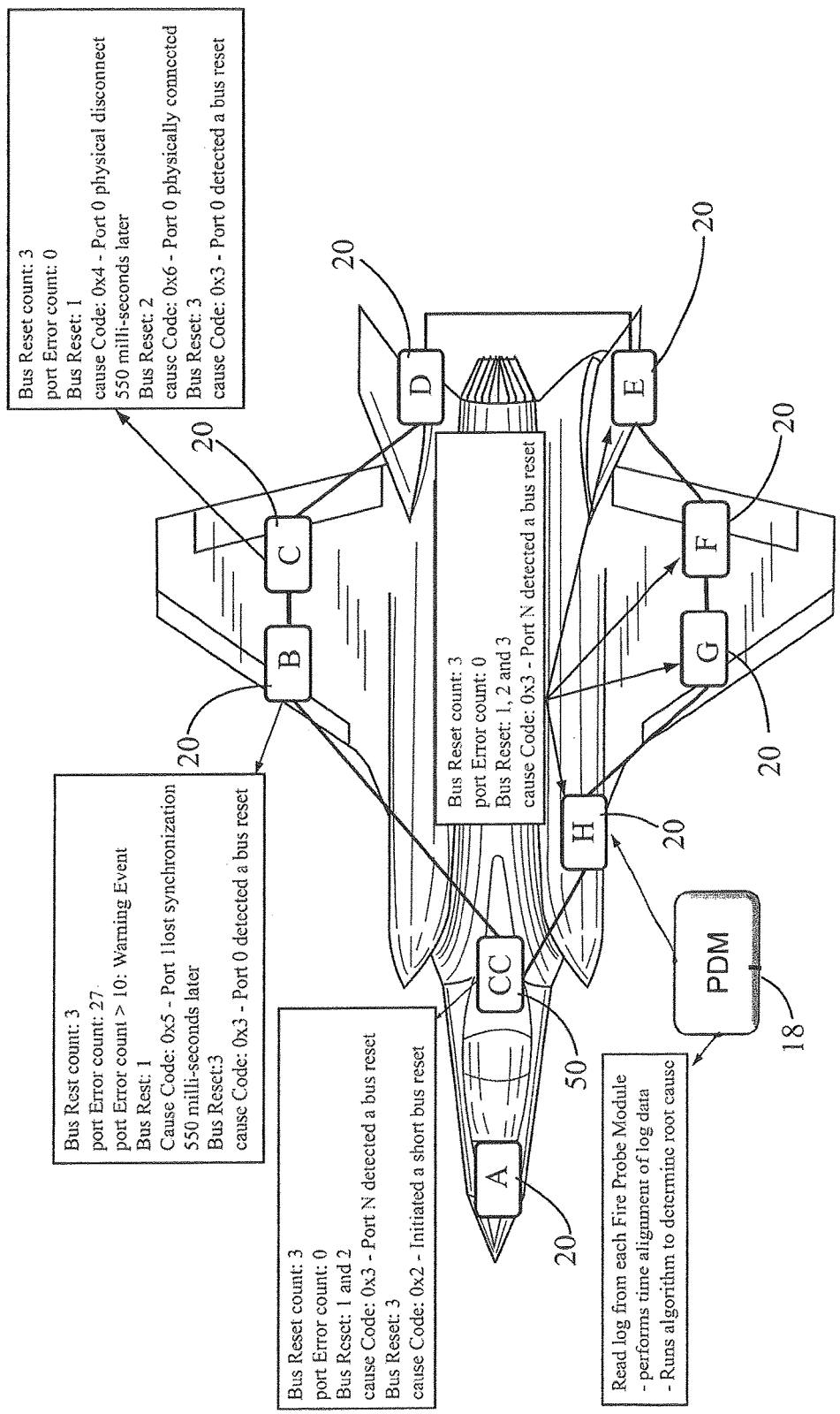
Figure 5 – Summary Information from Each Diagnostic Module

DIAGNOSTIC MODULE FOR MONITORING ELECTRONIC DATA TRANSMISSION

This non-provisional patent application is based on and claims the benefit of an earlier filed provisional patent application, Ser. No. 61/912,605, filed on Dec. 6, 2013, by the subject inventor and having a title of "Diagnostic Module for Monitoring Electronic Data Transmission".

FIELD ON INVENTION

This invention relates to a diagnostic module used for any data transmission, such as used with an IEEE-1394 High Performance Serial bus, and more particularly, but not by way of limitation, to a sub-diagnostic module that can enable and disable logging of an interconnect, physical layer and above layers events, provide a log format, and provide a means to access logged events both remotely and locally.

DISCUSSION OF PRIOR ART

Currently, IEEE-1394-2008 Serial bus technology provides access to a very limited number of diagnostic registers, which in turn provide useful but limited diagnostic information. Also, this Serial bus technology provides a means to read both locally and remotely standard defined PHY registers, which provides limited non-configurable status/diagnostic information. In addition, this technology can be used to define an optional Serial bus Management MAINT_UTILITY register, but with no register field definition.

Heretofore, there have been a number of both IEEE-1394 and other communication protocol issued patents. These patents are U.S. Pat. No. 7,783,812 to Mourn et al., U.S. Pat. No. 8,480,433 to Huang, and U.S. patent application WO 2009068879 A1 to Graber et al. None of these patents or applied for patents describe the unique features of the subject invention for greatly improved IEEE-1394 diagnostic capability incorporated into enabled nodes.

SUMMARY OF THE INVENTION

In view of the foregoing, it is a primary object of the subject invention to provide a sub-diagnostic module to locally acquire internal node or device information and log that information for both node and network diagnostic reasons.

Another objective of the invention is to allow a real-time Portable Diagnostic Module to retrieve time synchronized diagnostic information and correlate this information to diagnose multi-device issues.

Still another objective of the invention is to allow each Sub-Diagnostic Module, based on its configuration, to autonomously generate a warning event that can be used by the real-time portable diagnostic monitor to potentially resolve issues or at least provide a warning to a network system.

These and other objects of the present invention will become apparent to those familiar with IEEE-1394 Serial bus technology and other similar communication technologies when reviewing the following detailed description, showing novel construction, combination, and elements as described herein.

BRIEF DESCRIPTION OF THE DRAWINGS

FIG. 1 illustrates a Sub-Diagnostic Module incorporated into a System Module.

FIG. 2 illustrates various functional circuits making up the Sub-Diagnostic Module.

FIG. 3 is an example of a diagnostic module register map.

FIG. 4 and FIG. 5 illustrate a typical use of a plurality of Sub-Diagnostic Modules incorporated into System Modules mounted on various locations on an aircraft.

DETAILED DESCRIPTION OF THE PREFERRED EMBODIMENTS

In the accompanying drawings, the subject Sub-Diagnostic Module, having a trademark of FireProbe™, is illustrated with complete preferred embodiments and according to the best modes presently devised for the practical application of the modules architecture, and in which:

In FIG. 1, the subject invention is shown as Sub-Diagnostic Module 10 and incorporated into a System Module 12. The System Module 12 is optionally connected to a local host processor 14 and a 1394 Serial bus 16. The Serial bus 16 is attached to a Portable Diagnostic Module 18 and a plurality of similar diagnostic System Modules 20. The System Modules 20 are designated as System Module A, B, through Z. These modules are similar to System Module 12 and connected to the Serial bus 16. Also, the modules A, B through Z include multiple System Modules 12. Each system 12 includes a physical layer (PHY) 22 and optionally a link 24 for communicating diagnostic information, as indicated by arrows 26, 28 and 30. In this drawing, arrow 32 represents an access of the Portable Diagnostic Module 18 using network technology from the IEEE-1394 Serial bus 16. Also and optionally, the local host processor 14, using a proprietary implementation, can network with the Sub-Diagnostic Module 10, as indicated by arrow 34.

In FIG. 2, various functional circuits are illustrated making up the Sub-Diagnostic Module 10. The Sub-Diagnostic Module 10 receives signals from the System Module 12 through the Diagnostic Signal interface 38. The Diagnostic Signal Interface 38 passes the signals through to a Diagnostic Signal Evaluation Logic 40. The Diagnostic Signal Evaluation Logic 40 determines if a signal or combination of signals is an event to be recorded in a Sub-Diagnostic Register 36 and/or the Sub-diagnostic Log Memory 42. The events recorded in the Register 36 and Log Memory 42 are accessed by the Portable Diagnostic Module 18, as shown in FIG. 1, or optionally by the Local Host Processor 14 through interfaces 26 and 34, as shown in FIG. 1, and through the Sub-Diagnostic Protocol Interface 46. Recorded events placed in the Log Memory 42 are synchronized by a Sub-Diagnostic Synchronization Timer 44. The Timer 44 receives high resolution time information from a local clock, such as a physical layer clock, and lower resolution network synchronized information from the Sub-Diagnostic Protocol Interface 46.

The Sub-Diagnostic Module 10 includes a plurality of registers 36 with generic counters having programmable counter threshold settings and comparators used to test expected and unexpected values. The generic inputs of the registers are connected to various module signals that need monitoring. These signals to be monitored are connected to the Diagnostic Signals interface 38 and the Diagnostic Signal Evaluation Logic 40. Also, the registers 36 and the Evaluation Logic 40 are connected to the Log Memory 42. The diagnostic signals are then evaluated and either directly logged or registered into the counters for statistic monitoring.

When the Evaluation Logic 40 determines an event, information is either recorded to the Log Memory 32 directly or to the Register 36. When the event occurs, a time stamp is placed in the log before the event itself is logged. The free running Synchronized Timer 44 provides a high resolution time stamp offset. The time stamp is synchronized to the System 10 or the local host processor 14 through the Diagnostic Protocol Interface 46. The Interface 46 decodes a time synchronization packet. Both the Registers 36 and the Log Memory 42 are accessed through the Diagnostic Protocol Interface 46. The Registers 36 are scalable to support a user defined number of counters, thresholds, comparators, enables etc. The registers are grouped as follows:

- Diagnostic Information Block registers
- Counters and Counter Threshold registers
- Comparator (Expected, Unexpected) registers
- Rate registers
- Mask (Enables) registers
- Other registers An example Diagnostic module register map is show in FIG. 3.

Events are time stamped and logged. Example events that could be logged are:

- Resets
- Counter increments
- Warnings
- Time Sync Markers
- Etc. . . .

For IEEE-1394 implementations, the Reset is a 1394 Bus Reset. In addition to the bus reset indication, the cause of the bus reset is also logged. For each bus reset, diagnostic information is logged; Bus Reset Event, Bus Reset Event Cause and which port caused the Bus Reset.

Each time a counter is incremented, the event is stored in the log. The specific signal(s) that cause a Diagnostic counter to increment are implementation dependent. For IEEE-1394 implementations, a few of a possible many signals are: portError, invalid 8b10b symbol, unexpected control character, running disparity error, resetCount>3, invalidCount>3, etc. . . .

There are two types of occurrences that can cause a Warning Event to be generated. When an Event threshold is reached or a specific enabled Cause Code (CauseCode) is generated. Each counter has an associated counter threshold. When enabled, if the counter value equals the counter threshold, a Warning Event is generated. When enabled, if a specific event cause occurs, then a Warning Event is generated.

In addition, if enabled, it can cause the PHY to generate a Warning Extended Link On packet. Only one warning event is generated per threshold or CauseCode.

The intent of the Warning Event is to provide a single packet that is generated during normal bus operation. This will indicate to system diagnostics that an event has occurred serious enough to generate a warning message. Depending on the warning, this could trigger system software to take specific actions such as; indicate "Warning" to the user, generate a platform level error code, run built in diagnostic software, etc. . . . Only one Warning Event is generated for a specific threshold value being reached or CauseCode.

The Time synchronization between Sub-Diagnostic Module is accomplished by a "Controller" sending a Time Synchronization Packet (Time Sync Marker) which when received by a Sub-Diagnostic Module causes a time stamp to be logged without a specific event. If sent periodically for a number of times, this method can be used to determine the difference in free running clock frequency in all Sub-Diagnostic Modules.

TABLE 1 shows an example log event type field definition. Each event log entry contains a type field to indicate the type of information being logged. Example event types are:

TABLE 1

Example Event Log Type Codes

| Type Code | Name | Description |
| --- | --- | --- |
| 0x0 | — | Empty |
| 0x1 | time_sync_lo | Time synchronization low |
| 0x2 | time_sync_hi | Time synchronization high |
| 0x3 | bus_reset_event | Bus Reset event has occurred |
| 0x4 | bus_reset_event_cause | Bus Reset event cause |
| 0x5 | counter_event | Threshold or event cause event |
| 0x6 | warning_event | An enabled event has generated a warning |
| 0x7 | bus_reset_event2 | Loop disabled indication for ports 3 through 15 |
| 0x8 | bus_reset_event3 | Port connection status for ports 3 through 15 |
| 0x9-0xF | — | Reserved |

The diagnostic protocol used to communicate between a Sub-Diagnostic Module a Portable Diagnostic Module may be implemented using various methods such as asynchronous transactions, asynchronous streams, PHY packets, etc.

The diagnostic protocol includes several commands designed to allow a Portable Diagnostic Module to communicate with the Sub-Diagnostic Module. TABLE 2, defines several possible commands used to create a diagnostic protocol.

TABLE 2

Example Diagnostic protocol commands

| Command | Description |
| --- | --- |
| 1 | Read Request |
| 2 | Read Response |
| 3 | Write Request |
| 4 | Write Response |
| 5 | Time Sync Lo/Time Sync Hi |
| 6 | Command Request |
| 7 | Command Response |
| 8 | Read Log Request |
| 9 | Read Log Response |
| 10 | Warning |
| 11 or larger | Reserved for future use |

Time synchronization of all diagnostic modules 10 is provided by a Time Synchronization Master sending out a time synchronization packet or another signal such as IRIG. Diagnostic protocol defines the Time Sync Hi/Lo packets. However, other means such as IEEE-1394-2008 defined Cycle Start packets or AS5643 defined Start of Frame Packets can be used.

The Diagnostic Command Request of Time Sync Markers can be broadcasted to all System Modules 12 connected to the 1394 Serial bus 16. Each time a Time Sync Marker command is received, the Time Sync Hi/Lo with offset is recorded. By sending several Time Sync Marker commands at a fixed interval, System Module to System Module variation in free running clock can be determined. This process may be repeated periodically over a recording period to help determine if the free running clock frequency changed over time. This allows post processing software to look at the varying offset times of each System Module 12 to determine the difference in PHY clocks of each System Module. Software can then make the necessary adjustments to align the logs from all Sub-Diagnostic Module 10 implementations.

In FIGS. 4 and 5, an example of a typical use of a plurality of the Sub-Diagnostic Modules 10 are shown and used in an IEEE-1394 aircraft management network type system. In this example, data is logged from just after power up, the takeoff of the aircraft, through flight, and then landing. Once the aircraft is parked, the logged data is downloaded from each Sub-Diagnostic Module 10 by the Portable Diagnostic Module 18, shown in FIG. 4, for processing.

These drawings illustrate a simplified IEEE-1394 network having a Control Computer (CC) System Module 50 connected to the remote System Modules 20, shown as A through H. The remote Modules 20 are shown in FIG. 4. While it is not required, all System Modules 20 in this example include the Sub-Diagnostic Module 10. As mentioned above and when the aircraft is parked, the Portable Diagnostic Module 18 is connected to one of the System Modules 12 on the aircraft. In this example, the Portable Diagnostic Module 18 is connected to node H.

In this example, a connection between nodes B and C is faulty. From the time when logging begins to downloading, the Sub-Diagnostic Module 10 in node B has counted and logged, with a time stamp. 27 port errors on port 1 (the port connected to System Module C) and three bus resets were logged. The System Module 12 in node C counted zero port errors and three bus reset.

When the Sub-Diagnostic Module 10 in System Module 12 in node B detects the $10^{th}$ port error, the port error threshold is exceeded and the Warning Event enable is true causing Sub-Diagnostic Module 10 in node B to generate a Warning Event indicating the port errors. The Warning Event is received by the Sub-Diagnostic Module 10 in the CC System Module and processed.

The cause (causeCode) of the first bus reset, as logged by the Sub-Diagnostic Module 10 in node B, was loss of synchronization on port 1 and initiate bus reset. The Sub-Diagnostic Module 10 in node C sees a physical disconnect on port 0 and initiated a bus reset. All other Sub-Diagnostic Modules 10 in the other System Modules 12 connected to the 1394 bus detected a bus reset but didn't initiate one. The second bus reset occurred 550 msec after the first bus reset. The Sub-Diagnostic Module 10 in node B reports a cause of connection on port 1 and initiated bus reset while Sub-Diagnostic Modules 10 in the other System Modules connected to the 1394 bus detect a bus reset, but didn't initiate one. The third bus reset was initiated by the CC System Module 50 while all other System Modules on the bus detect a bus reset, but didn't initiate one.

Based on the time synchronized information retrieved from each of the Sub-Diagnostic Module's logs, using the diagnostic protocol, the Portable Diagnostic Module 18 is able to determine that twisted pair A (TPA) signals connecting port 1 of node B to port 0 of node C is faulty. This information can then be used to provide step by step repair instructions.

The following are example assumptions. They are:
System integrator assigned StaticIDs equal to channel number of each System Module.
Thresholds and comparator values are either set in hardware or programmed by a Control Computer (CC).
Threshold and/or CauseCode Warning Event enables are either set in hardware or programmed by a CC.
Warning Event is enabled (limit is set if applicable) is set in hardware or programmed by a CC.

Start:
After system power-up and flight control bus becomes stable the CC sends broadcast Module Clear Counter and Log commands.
CC sends five (5) broadcast Time Sync Marker commands 1 msec apart.
The plane takes off, flies its mission and lands.
If in the course of a take-off, flight and landing a Warning Event message(s) is generated, the CC receives the warning and takes the necessary action, such as notifies the plane prognostic system.
Once the plane parks the Portable Diagnostic Module 18 is attached.
Using the module registers 36, the Portable Diagnostic Module 18 reads register 0 to determine which nodes include the Sub-Diagnostic Module 10.
If a node includes a sub-diagnostic module 10, the StaticID is captured.
The Sub-Diagnostic Module's log is read until empty using Read Log messages.
This process is repeated until all Sub-Diagnostic Module's logs have been read.
The Portable Diagnostic Module 18 then determines the time between each Time Sync Marker within a group. There might be more than one grouping of Time Sync Markers within a log. These times are then compared with the 1 msec timing that was generated by the CC. The log timing from each node is adjusted according to the difference observed.
Using the adjusted timing all logged data from all Sub-Diagnostic Modules are correlated and processed.
Each Bus Reset event is processed (topology map is created, bus reset cause is determined, etc. . . . )
Each increment counter event is processed
Each threshold event is processed
Each cause Code event is processed
Each compare event is processed
After all logged information is processed algorithms are run on the data to determine:
Did specific System Module generation bus resets and why
Did specific Sub-Diagnostic Module counters increment (which counter would help determine why)
Did specific Sub-Diagnostic Module comparator equal specific values and why
Etc. . . .
Based on predefined algorithms, conclusion regarding bus behavior is provided via the Portable Diagnostic Module user application
Example: RIO module 4 located behind #13 potentially has a bad connection with Actuator module 3 located behind door #7. Please follow procedure XXX to verify the electrical connection.

While the invention has been particularly shown, described and illustrated in detail with reference to the preferred embodiments and modifications thereof, is should be understood by those skilled in the art that equivalent changes in form and detail may be made therein without departing from the true spirit and scope of the invention as claims except as precluded by the prior art.

The embodiments of the invention for which an exclusive privilege and property right is claimed are defined as follows:

1. A Sub-Diagnostic Module incorporated into a System Module, the Sub-Diagnostic Module used to retrieve time synchronized diagnostic information and correlate the information to diagnose multi-device issues on an Aircraft in real time, the Sub-Diagnostic Module can be used to autonomously generate a warning event to potentially resolve issues or at least provide a warning to a network system, the System Module mounted on Nodes used on the Aircraft, the System Module connected to a local host processor and a 1394 serial bus, the Sub-Diagnostic Module comprising:
- a diagnostic signal interface connected to a diagnostic signal evaluation logic, the signal interface and the evaluation logic used for evaluating at least one signal to determine an event;
- at least one register connected to the evaluation logic, the register for recording an event as determined by the evaluation logic;
- at least one log memory connected to the register and the evaluation logic for recording the event as determined by the evaluation logic and register;
- a timer connected to the register for providing a high resolution time stamp offset; and
- a Phy clock connected to the synchronized timer.

2. The Sub-Diagnostic Module as described in claim 1 further including a plurality of registers with counters, the counters having programmable counter threshold settings and comparators used to test expected and unexpected values, generic inputs to the registers are connected to the evaluation logic for monitoring.

3. The Sub-Diagnostic Module as described in claim 2 wherein the Sub-Diagnostic Module is connected to a Portable Diagnostic Module, the Portable Diagnostic Module used for gathering diagnostic information saved in the registers and the log memory in the Sub-Diagnostic Module.

4. The Sub-Diagnostic Module as described in claim 1 wherein the System Module includes a physical layer and an optionally link layer for sending diagnostic information.

5. A Sub-Diagnostic Module incorporated into a System Module, the Sub-Diagnostic Module used to retrieve time synchronized diagnostic information and correlate the information to diagnose multi-device issues on an Aircraft in real time, the Sub-Diagnostic Module can be used to autonomously generate a warning event to potentially resolve issues or at least provide a warning to a network system, the System Module mounted on Nodes used on the Aircraft, the System Module connected to a local host processor and a 1394 serial bus, the Sub-Diagnostic Module comprising:
- a diagnostic signal interface connected to a diagnostic signal evaluation logic, the signal interface and the evaluation logic used for evaluating at least one signal to determine an event;
- a plurality of registers connected to the evaluation logic, the registers for recording events as determined by the evaluation logic, the registers including counters having programmable counter threshold settings and comparators used to test expected and unexpected values;
- a plurality of log memories connected to the registers for recording events as determined by the evaluation logic and registers and recording the events, the log memories including a timer and status information;
- a synchronized timer connected to the registers for providing a high resolution time stamp for logged events; and
- a Phy clock connected to the synchronized timer, the Phy clock providing a high resolution offset timer clock to the synchronized timer.

6. The Sub-Diagnostic Module as described in claim 5 wherein the Sub-Diagnostic Module is connected to a Portable Diagnostic Module, the Portable Diagnostic Module used for gathering diagnostic information saved in the registers and log memory in the Sub-Diagnostic Module via a diagnostic protocol interface, the Sub-Diagnostic Module mounted on various System Modules in a network.

7. The Sub-Diagnostic Module as described in claim 6 wherein System Modules include a physical layer and an optionally link layer for sending diagnostic information.

8. A combination of a Sub-Diagnostic Module and a System Module, the Sub-Diagnostic Module incorporated into the System Module, the Sub-Diagnostic Module used for monitoring diagnostic signals from System Modules mounted on nodes, the System Module connected to a local host processor and a 1394 serial bus, the Sub-Diagnostic Module used to retrieve time synchronized diagnostic information and correlate the information to diagnose multi-device issues on an Aircraft in real time, the Sub-Diagnostic Module can be used to autonomously generate a warning event used by real time portable diagnostic monitors to potentially resolve issues or at least provide a warning to a network system, the System Module mounted on Nodes used on the Aircraft, the System Module connected to a local host processor and a 1394 serial bus, the combination comprising:
- the Sub-Diagnostic Module including a diagnostic signal interface connected to a diagnostic signal evaluation logic; the signal interface and the evaluation logic used for evaluating at least one signal to determine an event;
- a plurality of registers connected to the evaluation logic, the registers for recording the event as determined by the evaluation logic, the registers including counters having programmable counter threshold settings and comparators used to test expected and unexpected values;
- a synchronized timer connected to the registers for providing a high resolution time stamp for logged events;
- a Phy clock connected to the synchronized timer, the Phy clock providing a high resolution offset timer clock to the synchronized timer;
- a plurality of log memories connected to the registers for recording events as determined by the evaluation logic and registers and recording the event, the log memories including a timer and status information; and
- the System Module including a physical layer and an optionally link for sending diagnostic information.

9. The combination as described in claim 8 wherein the Sub-Diagnostic Module and System Module are connected to a Portable Diagnostic Module, the Portable Diagnostic Module used for gathering diagnostic information saved in registers and log memory in the Sub-Diagnostic Module via a diagnostic protocol interface, the Sub-Diagnostic Module mounted on various System Module locations on a network.

* * * * *